(12) United States Patent
Grimminger

(10) Patent No.: US 7,408,943 B2
(45) Date of Patent: Aug. 5, 2008

(54) METHOD AND DEVICE FOR MAPPING NETWORK HEADERS ONTO MPLS HEADERS IN BEARER ARCHITECTURES

(75) Inventor: Jochen Grimminger, München (DE)

(73) Assignee: Siemens Aktiengesellschaft, Munich (DE)

( * ) Notice: Subject to any disclaimer, the term of this patent is extended or adjusted under 35 U.S.C. 154(b) by 903 days.

(21) Appl. No.: 10/493,250

(22) PCT Filed: Oct. 7, 2002

(86) PCT No.: PCT/DE02/03786

§ 371 (c)(1),
(2), (4) Date: Apr. 21, 2004

(87) PCT Pub. No.: WO03/039104

PCT Pub. Date: May 8, 2003

(65) Prior Publication Data

US 2004/0246957 A1    Dec. 9, 2004

(30) Foreign Application Priority Data

Oct. 22, 2001  (DE) .................................. 101 52 011

(51) Int. Cl.
*H04L 12/28* (2006.01)
(52) U.S. Cl. ....................... 370/401; 370/338; 370/389; 370/467
(58) Field of Classification Search ....................... None
See application file for complete search history.

(56) References Cited

U.S. PATENT DOCUMENTS

| 6,606,681 | B1 * | 8/2003 | Uzun ........................... 711/108 |
| 6,674,744 | B1 * | 1/2004 | Doshi et al. .................. 370/352 |
| 2001/0025321 | A1 * | 9/2001 | Tang et al. ................... 709/246 |

* cited by examiner

*Primary Examiner*—Bob A Phunkulh
(74) *Attorney, Agent, or Firm*—Bell, Boyd & Lloyd LLP

(57) ABSTRACT

The invention relates to a method for exchanging information between components in a network by means of terminals which exchange IP information packets over the network, the IP information packets being provided with IP headers having IP addresses. The components include a memory area in which unequivocal terminal identifiers are managed in relation to IP addresses, at least one part of the components in the network being MPLS-enabled and used to route information packets through the network on the basis of MPLS paths and corresponding MPLS headers.

8 Claims, 2 Drawing Sheets

METHOD AND DEVICE FOR MAPPING NETWORK HEADERS ONTO MPLS HEADERS IN BEARER ARCHITECTURES

CLAIM FOR PRIORITY

This application claims priority to International Application No. PCT/DE02/03786, which was published in the German language on May 8, 2003, which claims the benefit of priority to German Application No. 101 52 011.5, which was filed in the German language on Oct. 22, 2001.

TECHNICAL FIELD OF THE INVENTION

The present invention relates to a method and device for mapping network headers, and in particular, mapping network headers to MPLS headers in bearer architectures.

BACKGROUND OF THE INVENTION

With the introduction of packet-oriented technologies such as UMTS and GPRS, it is to be expected that data transmission will increasingly take place wirelessly in future. At the same time the data transmission will not be restricted to the transmission of voice information, but rather other services, such as those offered for example on the Internet, will increasingly be used wirelessly.

At the present time, most mobile radio networks are structured on a connection-oriented basis. This connection orientation is present at least between the terminal device and the base station. The backbone networks, in contrast, often have a packet-oriented structure. With voice and data transmissions in particular, however, the full bandwidth is not needed, since a data transmission takes place only at discrete instants in time and there is often a long time interval between the individual, actual information transmissions. Consequently a large portion of the bandwidth is wasted. Packet-oriented networks have the advantage that only the required bandwidth is used by packets. In this case, the data stream is split up into small packets. A disadvantage with this approach, however, is that in certain conditions of increased demand insufficient bandwidth is available. With voice transmissions in particular this leads to a considerable loss in quality which manifests itself in poor sound quality. Quality management is necessary for networks of this kind. It is also necessary that the data packets are routed faster through the network. In order to achieve this, high-speed switches and routers are required.

In order to cater for the increased data traffic with wireless subscribers in the future also, access networks for mobile radio networks will also be IP-based in future, i.e. there will be an IP-based transport network, referred to as the RAN (Radio Access Network), between the base stations and the gateway into the core network. Terminal devices set up a connection via an air interface initially to a base station BS which terminates the air interface. The data of the terminal device MH is then routed by means of an access router AR. Generally the interconnected access routers form the radio access network. The AR handles the forwarding of the data to the radio access server (RAS) or further routers.

Because of the different topologies of the networks a protocol tunnel is often set up between terminal device MH and access router RAS or between AR and RAS as well as between AR and AR. A protocol tunnel is always present when a first transmission protocol is encapsulated in a second transmission protocol. This is referred to as encapsulating the packets of a first transmission protocol into the packets of the second transmission protocol. This is always necessary, for example, if the first transmission protocol is not supported on a network segment. The packet must then be routed in this network segment with the aid of the second transmission protocol. The protocol tunnel provides a number of advantages.

For the terminal device, mobility can be supported transparently in the transport network RAN using any means. This advantage is based on the fact that the packets are not modified and consequently the type and form of the transport can be determined by the topology of the network without any risk of a modification of the user data.

Non IP-based data (e.g. compressed and/or encrypted IP packets, voice) can simply be routed via the transport network RAN to suitable converters at the edge of the transport network RAN, provided the tunnel technology used supports the transport of data packets of other protocols than IP.

Known methods use tunnels either from the terminal device MH to the RAS or from the access router AR to the RAS. Different technologies can be used for this, e.g. PPP, IP-in-IP.

Because of its simple structures and high performance, MultiProtocol Label Switching (MPLS, IETF Proposed Standard, [RFC3031]) can also be used advantageously as the tunnel technology. In MPLS networks a packet travels from one router to the next. Each router makes an independent decision with regard to the forwarding of packets. This means that each router analyzes the header of the packet and each router executes a program with the router algorithm. Each router selects a new route as a function of the result of the router algorithm. The selection of the next route is therefore done in two steps. The first step partitions the entire set of possible packets into a set of forwarding equivalence classes (FEC). The second step maps each FEC onto a route. As far as the decision on the forwarding is concerned, no distinction is made between the packets belonging to the same FEC. Different packets belonging to the same FEC cannot be differentiated. In this respect the present invention is different. In order to be able to use labels as addresses, a unique assignment to an FEC must exist. In other words, an FEC only ever comprises one label. This label is assigned to one destination address only.

Packets which have a different destination or source address are regarded as different packets. In order to be able to use MPLS for the present invention, however, a path and therefore the equivalence class must be unique. This means that an equivalence class stands for a unique source and destination terminal device or entity, and is further described below. In an MPLS network the assignment to an FEC is made only once, namely at the time the packet enters the network. The FEC to which a packet is assigned, is coded as a short value which is referred to as a label. When a packet is sent to the next route, the label is sent with it. No analysis of the further contents of the packet is performed at the following routers. Only the label is checked. The label is used as an index for a table from which the next route and the next label can be retrieved. The old label is replaced by the new label and the packet is forwarded to the next route. In an MPLS network forwarding is controlled only by means of the labels. This has a number of advantages. For example, the routers only need to have limited capabilities. They merely need to be able to analyze the label and check in a table which route is assigned to this label in order to replace the old label by a new label. Furthermore a high throughput can be achieved by these simple tasks. Further advantages can be found in [RFC 3031].

A few principles will be defined in the following. A label is a short, locally significant identifier which has a fixed length and is used to identify a FEC. The label serves to represent an FEC to which the packet is assigned. In the basic usage of the FEC this is assigned on the basis of the destination addresses of the network layer. In the original usage of the FEC it is not a coding of the network address, however. It is at this point, as detailed below, that the present invention makes a difference. As a result of the unique assignment of the label to a unique path it is equivalent to the coding of a network address.

In order to ensure that the routers assign the packets to the same equivalence classes, the routers regularly have to exchange information from which it is clear which packets are assigned to a label. It is also important that the same labels are not used by different routers, insofar as this makes a unique identification of the preceding router impossible. It should further be pointed out that upstreams and downstreams are handled differently. Thus, for example, these do not necessarily have the same labels. In the MPLS architecture the decision to bind a specific label to a specific equivalence class is made by the router which is located downstream in relation to this binding. The router which is downstream then informs the router which is upstream about this binding. This information can be transmitted for example as piggyback information on other packets.

In a further embodiment MPLS supports a hierarchy, whereby the processing of the packets provided with labels is totally independent of the level of the hierarchy. A packet which has no label can be regarded as a packet whose stack is empty. The use of the stack becomes clear when reference is made to the tunneling of packets. Tunneling of this kind is described in the document [RFC3031]. Packets are always tunneled when they are routed through a network path which lies between two routers, whereby this network path can, in turn, comprise a series of routers. If, for example, an explicit path was specified which comprises the routers R1 to R4, and if, between the routers R1 and R2, there lies a path which comprises the routers R1.1, R1.2, R1.3, then a further label is pushed onto the stack by the router R1. The routers R1.1, R1.2, R1.3 now operate on this new second element. As soon as the packet arrives at router R2, the topmost element is popped from the stack. It becomes problematical when there is no label on the stack. In the normal MPLS architecture the network address (normally the IP address) is analyzed in order to determine an equivalence class.

MPLS provides two types of route selection. The first type of route selection specifies the route already at the starting point. The individual routers which have to be passed through are determined. This entails a form of explicit routing. With hop-by-hop routing the routers are not specified explicitly, so each router can specify on the basis of its tables which is to be the next router. The present invention can be operated with both these methods of route selection.

Existing approaches to using MPLS are based on a use of MPLS in the interior of the network, for example between access router AR and RAS in the mobile radio network.

If the terminal device MH switches during ongoing operation from router ARx to router ARy, then it has to re-register with the access router (authentication). With this movement of the terminal device to a different base station or another access router, this tunnel is now switched to the current anchor point by means of signaling. Toward that end, however, this must be supported in different variations of the implementation in the access network IPv6 (IP version 6). As the mapping of such architectures onto existing IP backbones has revealed, a form of MPLS is mainly supported in this. IP networks are therefore implemented as overlay/VPN (Virtual Private Network) structures and their packets only switched quickly, which means less network load and overhead for router operation. In a tunneling of the information, however, an overhead does result in terms of the size of the information packets. IPv6 headers cause more than 40 bytes of header overhead at an average transport data size of 60 bytes (IPv6 incl. routing header), the user data of which in turn comprises only about 20 bytes (VoIP) [RFC 3031, RFC 2460]. Only 4 bytes are induced in each case by means of a shim header or MPLS header of, for example, MPLS. A shim header, also MPLS header, comprises further status and administrative information in addition to the label, which accounts for approx. 20 bits. Basically, a unique identification of the point-to-point link with its attributes, e.g. Quality of Service (QoS), and, of course, the identification of the respective bearer are required.

Known methods for reducing the overhead consist of a compute-intensive compression technique [RFC2507] (price-rohc-epic-00.txt [www.ietf.org/internet-drafts]) which the individual components or routers must support. These methods must manage the dynamic status during the connection, resulting in the consumption of a lot of resources (memory, CPU) and therefore imposing limits on the performance of the components. Where there are a great number of terminal devices (several thousand mobile handsets) which have to be served by a component, this can lead to an overloading of the system.

It should however be pointed out that the problems cited are not just restricted to networks which are operated with mobile terminal devices. Rather, this problem arises whenever different network topologies and architectures come into contact with one another and a tunneling of information packets becomes necessary. A limitation of the present invention to mobile radio networks is not intended.

SUMMARY OF THE INVENTION

The present invention provides a method which reduces the size of the headers.

A unique identification of the point-to-point link, in other words the MPLS path, with its attributes (e.g. QoS (Quality of Service)) and, of course, the identification of the respective bearers (connection service) are necessary. For this purpose, however, two or more MPLS headers are to a large extent sufficient, with one of them having component-related significance. The second can be used dynamically networkwide, as is usual with MPLS. As a rule this does not result in a restriction only to MPLS (e.g. PPP).

The external MPLS headers are used for identifying the point-to-point link and its attributes, as defined in the IPv6 header. These can even be modified by the network, if necessary, so long as the link scope is not destroyed at the end component. The internal headers serve to identify the bearer, by using parts of a unique terminal device identifier, for example the RNTI [TS 25.331], as used in existing GSM/GPRS/UMTS architectures. This terminal device identifier identifies the respective terminal device bearers and is 12 bits, for example, in its short definition (long version 20 bits). Furthermore, several more bits are used in order to allow a flow identification. A shim header or MPLS header provides space for 20 bits per header. A maximum of two shim headers or MPLS headers are therefore sufficient for one-to-one mapping of the information necessary from IPv6 onto MPLS labels. IPv6-DiffServ can be taken over directly because it is supported in the shim headers or MPLS headers. Compatibility with existing facilities and principles of operation is maintained since internally the shim headers or MPLS headers can now once again be uniquely assigned to an IPv6 header or can be replaced by this, thereby completely preserving the architectural features and advantages which result from IPv6.

This ensures that a higher efficiency of the network is achieved with the aid of existing architectural components which preserve compatibility. Usually, for example, the existing RNTI presents itself as suitable since its 20-bit length enables a direct mapping onto the 20-bit label. In the network it is therefore possible to fall back on label switching, as a result of which network resources are saved.

Specifically, there is a method for exchanging information between components in a network which preferably includes a core network and a radio access network.

Components of the network, include, for example, terminal devices which exchange IP information packets via the network, the packets having IP headers including IP addresses. The terminal devices are preferably mobile terminal devices, such as mobile phones or PDAs. The terminal devices have a unique terminal device identifier on the basis of which they can be located in the network.

Unique terminal device identifiers in relation to IP addresses are administered in a memory area. By this means it is possible to map the IP addresses to the terminal device identifiers and vice versa.

The network, for example, has at least a subset of MPLS-capable components which route the information packets through the network on the basis of MPLS paths and corresponding MPLS headers. In a first configuration step, the components are able to configure themselves such that the MPLS paths to the terminal devices are unique, whereby the MPLS paths are identified at least by means of one mapping as a result of the unique terminal device identifier which is mapped in the MPLS headers. After the components have been configured, the information exchange is performed in the following steps.

In a second information transmit step the MPLS-capable components located at the start of the path remove the IP headers from the IP information packet in order then to provide the thus modified IP information packet with MPLS headers. The added MPLS header includes, for example, the terminal device identifier which is administered in relation to the IP address in order then to transmit the data packet thus modified. In a third information receive step which lies at the end of the path the MPLS-capable components read the MPLS headers of the information packets transmitted in the second step in order to determine the associated IP address on the basis of the terminal device identifier. In this case the IP address is loaded from the above mentioned memory area. This memory area can be a centralized or a decentralized memory area. Thus, for example, it is possible that each component has its own memory area in which the mapping is stored in readiness.

After the IP address has been determined, the information packet is modified such that the original IP header replaces the MPLS header.

Generally the components are known routers which have preferably been enhanced with suitable hardware components by means of software in order thereby to implement the above-described functionality.

In an advantageous embodiment, the network is a UMTS or GPRS network or a similar packet-oriented radio network for mobile terminal devices, whereby the terminal device identifiers may include network-specific RAI, RNTI (Radio Network Temporary Identities) or IMSI (further vendor-specific identifiers are possible). Depending on the chosen network, in which these terminal device identifiers are administered in a special register, this is for example an HLR (Home Location Register) or an HSS (Home Subscriber Service).

These registers are extended such that an IP header and/or an IP address are stored in addition to the terminal device identifier, thereby enabling a unique bijective mapping.

In a further embodiment, the terminal devices themselves are able to handle the exchange of the headers. In this case, a gateway is used in order to perform a mapping for the transition into a further external network which does not support the technology presented. When an information packet from the external network arrives the IP header is removed, and when a packet is transmitted into the external network the IP header is inserted, the communication in the internal network taking place on the basis of the MPLS headers. The gateway also has access to the memory area in which the mappings of the IP headers to the device identifiers are stored.

In an alternative embodiment, in addition to the path label the MPLS equivalence classes also include at least one label which codes the terminal device identifier, by means of which it can be established which path is intended for which terminal device. These equivalence classes are preferably the input equivalence classes, i.e. the classes which are taken into account when a packet arrives at the component. Through the use of a second label within the MPLS equivalence class it is specified that the terminal device identifier is part of the unique path.

In a further embodiment, instead of the entire IP header being removed only parts of the IP header are removed. This results in less overhead during the insertion and deletion of the addresses.

In a further advantageous embodiment, a plurality of MPLS labels are used in order to map an IP header onto an MPLS header and vice versa. A corresponding case has already been described above.

A further component of the invention is a transmitter which implements the method described. The transmitter is preferably disposed in a network which includes a core network and a radio access network. To the extent that the transmitter is not itself a terminal device, the transmitter has the switching task of implementing the communication of terminal devices. The terminal devices exchange IP information packets via the network which have IP headers including IP addresses. The transmitter comprises a device which permit access to a memory area in which unique terminal device identifiers are administered in relation to IP addresses. The device preferably comprise a network interface, to the extent that the memory area is administered by a central server. If, on the other hand, the device comprises a decentralized memory area which is administered by the transmitter itself, then the device is usually memories, controllers and microprocessors or a special chipset which is optimized for memory access.

The transmitter further comprises a device which route the information packets through the network on the basis of MPLS paths and corresponding MPLS headers. The device is preferably known switching fabrics such as those belonging to the prior art.

In still another embodiment, there is a processing unit which is preferably embodied as a processor or as a switching fabric removes IP headers from the IP information packet in order to provide the thus modified IP information packet with MPLS headers, whereby the MPLS header includes the terminal device identifier which is administered in relation to the IP address. The data packets modified in this way are then transmitted via the corresponding MPLS path to the terminal device.

In certain circumstances it may be necessary for the device accessing the memory to load the corresponding address or the header from the memory area.

In order to configure the unique paths to the terminal device in advance or to set up the equivalence class, a device is provided which configures the transmitter in such a way that the MPLS paths to the terminal devices are unique, whereby the MPLS paths are identified by the unique terminal device identifier which is mapped in the MPLS headers. The device preferably comprises a network interface and a corresponding processing unit which is either a microprocessor or the switching fabric. Typically, known modules are enhanced by suitable software in such a way that the required functionality can be implemented.

In a preferred embodiment in which the memory area is administered non-centrally at the transmitter, the terminal device identifiers are assigned to the corresponding MPLS equivalence classes, the terminal device identifiers already being coded as MPLS labels or MPLS headers.

In addition to the transmitter, a receiver is a further component and embodiment of the present invention. The receiver is a suitable counterpart to the transmitter. It is therefore disposed in the same network. It should be pointed out that the receiver and the transmitter are typically routers which represent the input and the output of an MPLS path. The components which are located within the path do not need the extended functionality. The receiver likewise has a device which permits access to a memory area in which unique terminal device identifiers are administered in relation to IP addresses.

The device can comprise elements which enable centralized as well as decentralized or local access to the memory area. Usually these are the same device as those used for the transmitter.

The receiver further comprises a device which receives the information packets from the network on the basis of MPLS paths and corresponding MPLS headers. Typically, they comprise a network interface having a suitable driver, the packets received in this way being forwarded to the processing unit.

The processing unit analyzes the information packets in order to determine whether the IP header has been removed. If this were to be the case, in the positive case the associated IP address is determined on the basis of the terminal device identifier by a memory access in order that the information packet can then be modified such that the original IP header replaces the MPLS header.

This processing unit too is preferably a known switching fabric and/or a microprocessor which have been enhanced with the necessary functionality with the aid of a suitable software solution.

Further components of the receiver include a device which configures the receiver in such a way that the MPLS paths to the terminal devices are unique, the MPLS paths being identified by the unique terminal device identifier which is mapped in the MPLS headers. This is a similar device as in the case of the transmitter, whereby, however, the equivalence classes are determined which are to be taken into account when the information packets arrive.

In a decentralized solution the terminal device identifiers are coded as MPLS labels and assigned to a specific equivalence class which determines the unique path to the terminal device.

Typically, routers or gateways have the features of both a transmitter and a receiver. In a further embodiment, in which the MPLS paths extend as far as immediately up to the terminal device, the terminal device has the described features of the transmitter and the receiver. In an optimized version the conversion of the IP addresses is then no longer necessary provided the communication takes place in a homogeneous network. A conversion or mapping is necessary only if the network is left by a gateway.

BRIEF DESCRIPTION OF THE DRAWINGS

The process is represented schematically below with reference to figures, in which.

DETAILED DESCRIPTION OF THE INVENTION

Figure 1:
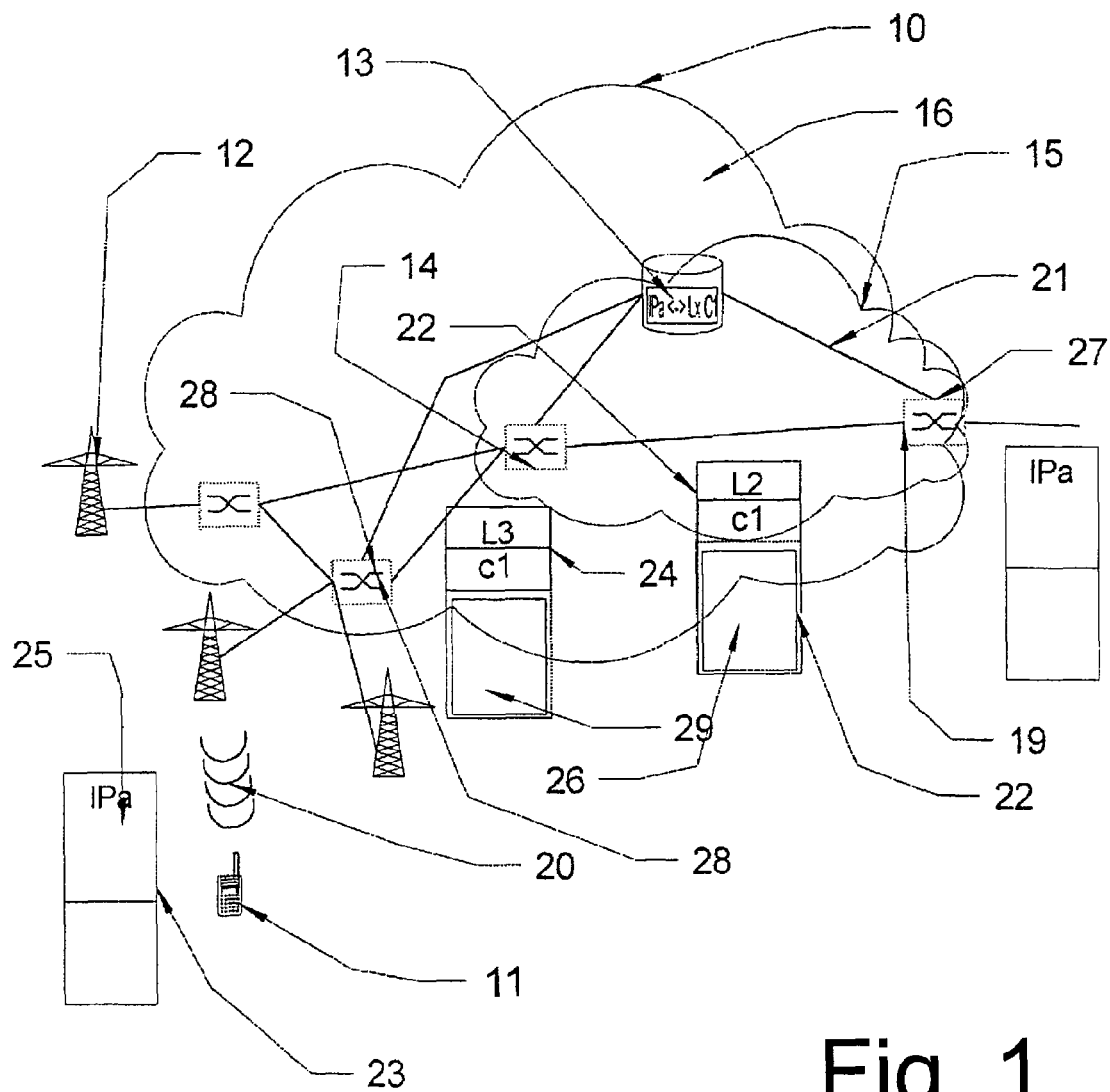
FIG. 1 shows a network including a core network and a radio access network having a transmitter.

FIG. 1 shows a basic structure of a network in the radio area. In this case a network architecture 10 includes a radio access network 16 and a core network 15. The core network 15 can set up the connection to the Internet via a gateway/router 19. Both networks includes a number of components 19, 13, 12, 14.

A User Plane Server (UPS) 14 administers the radio protocol 20 in order to transport information packets to the terminal device 11 via radio interfaces. A Radio Control Server (RCS) 16 administers the frequency band and permits the allocation or denies the allocation of frequencies if a bottleneck should arise. These two components, which also have router functionalities, form the radio access network 16 together with the corresponding cable connections 21.

The core network in turn comprises routers 19 which are connected to the UPS. An HLR (Home Location Register) 13 administers the unique identifier of the terminal device and its current position. The HLR 13 further comprises the mapping of the IP address to the MPLS headers or labels. In the present example this mapping is stored at a decentralized location. The transmitter 27 and the receiver 28 have access to this register.

As a rule, however, this position is merely a region indication. The HLR/HSS further administers the call numbers and the current IP address.

The components of the core network and the radio access network are connected to one another via fiber optic or copper cable 21. It is however possible that these components are in contact with one another by a radio relay link.

A transmitter 27 receives an information packet 22 which has an IP header 25. The IP address is used to determine the device identifier, which in the present case is coded in two MPLS headers 24. These MPLS headers reside in the stack in the information packet 22, which exclusively comprises MPLS headers.

The transmitter 27 removes the IP header 25 and adds further information with the result that the data area 29 is made bigger. The thus modified packet 26 is forwarded to the receiver 28 via a further router which modifies the first MPLS header in accordance with the standard. The receiver 28 then removes the MPLS header 24 and replaces it with an IP header. The receiver establishes the correct IP header on the basis of the information which is stored in the register 13. In an alternative embodiment, this information can also be stored locally at the receiver.

The methods for exchanging the mapping have already been described above. Because of the varying data area 29 it can happen that a number of packets are combined or split apart. A suitable numbering of these packets is part of the prior art.

Figure 2:
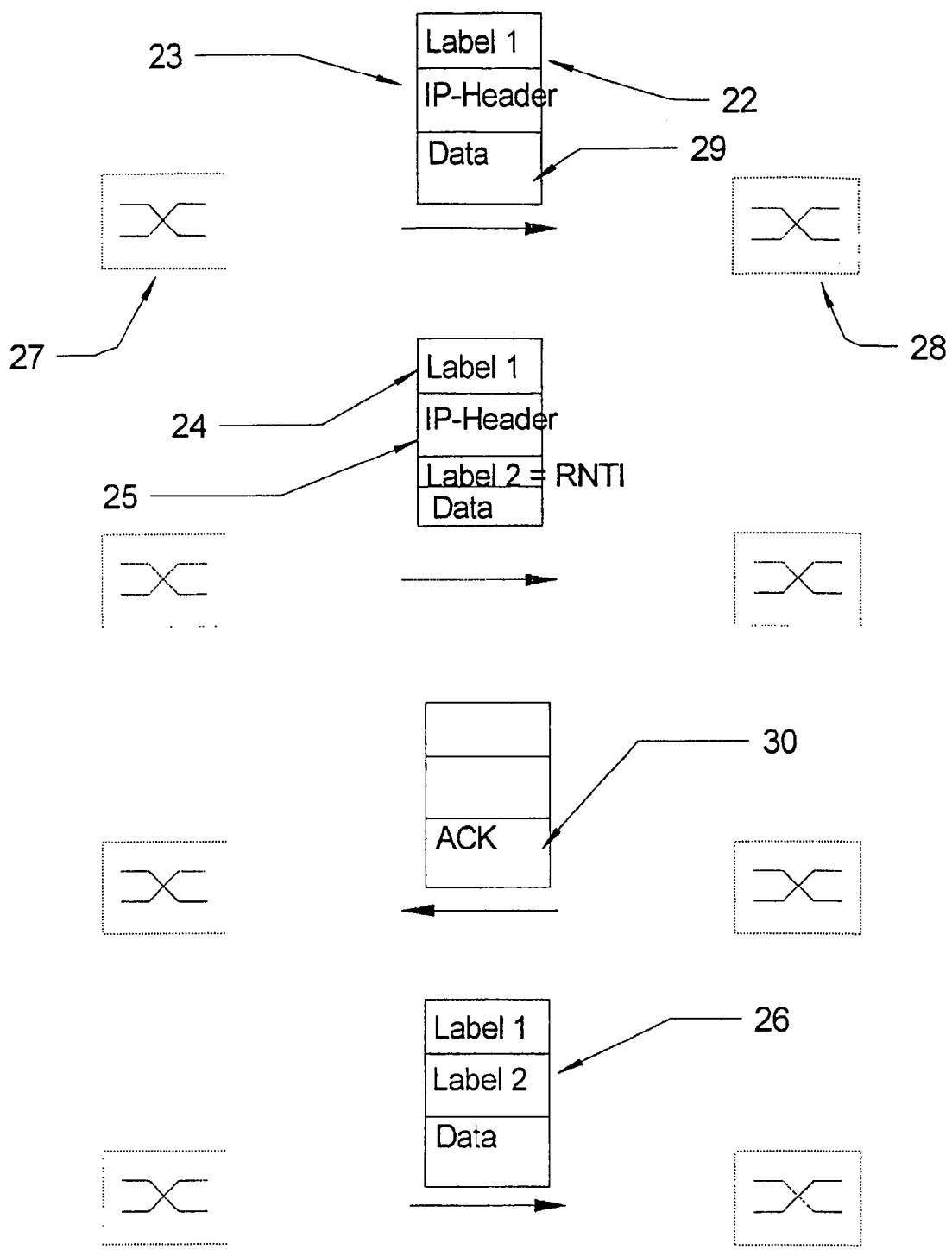
FIG. 2 shows information packets during the different transmission states, whereby the optimized transmission takes place after an acknowledgement by an Acknowledge packet.

FIG. 2 shows a transmission method in which four states are described. These four states mirror the communication in the network. In the first state the transmission takes place in the form of tunneled IP packets. During the second state a further label is inserted which is intended to replace the IP address in future. This label can code the RNTI. Other unique identifiers are also possible. An end-to-end transmission takes place in the fourth state, after the distant station, in other words the receiver, has sent an acknowledgement 30 in which it confirms that the mapping has been learned.

What is claimed is:

1. A method for exchanging information between components in a network which includes a core network and a radio access network, having terminal devices which exchange, via the network, IP information packets which have IP headers including IP addresses, having a memory area in which unique terminal device identifiers are administered in relation to IP addresses, comprising:

routing, via at least one subset of MPLS-capable components in the network, the information packets through the network based on MPLS paths and corresponding MPLS headers;

configuring the components such that the MPLS paths to the terminal devices are unique, the MPLS paths being identified by the unique terminal device identifier which is mapped in the MPLS headers;

removing, via the MPLS capable components, at least part of the IP headers from the IP information packet to provide modified IP information packet with MPLS headers, the MPLS header including the terminal device identifier which is administered in relation to the IP address to send the modified data packet; and reading, via the MPLS-capable components, the MPLS headers of the information packets sent to determine an associated IP address based on the terminal device identifier to modify the information packet such that the original IP header replaces the MPLS header.

2. The method according to claim 1 wherein the components function as a router.

3. The method according to claim 1, wherein the network is a UMTS or GPRS or a similar packet-oriented radio network for mobile terminal devices, wherein the terminal device identifiers include network-specific RAI, RNTI or IMSI and further identifications.

4. The method according to claim 1, wherein the memory area in which the terminal device identifier is stored is an HLR or HSS.

5. The method according to claim 1, wherein the terminal device identifiers are stored in the memory area in relation to the IP headers and/or IP addresses.

6. The method according to claim 1, further comprising removing the IP header, via a gateway to an external network, when an information packet arrives from the external network, and inserting the IP header when a packet is transmitted into the external network, the communication in the internal network taking place based on the MPLS headers.

7. The method according to claim 1, wherein the MPLS equivalence classes include at least one label which codes the terminal device identifier, by which it can be determined which path is intended for which terminal device.

8. The method according to claim 1, wherein a portion of the IP header is removed.

* * * * *